(12) United States Patent
Travers

(10) Patent No.: US 7,397,607 B2
(45) Date of Patent: Jul. 8, 2008

(54) MICRO-DISPLAY ENGINE

(75) Inventor: Paul J. Travers, Honeoye Falls, NY (US)

(73) Assignee: Vuzix Corporation, Rochester, NY (US)

( * ) Notice: Subject to any disclaimer, the term of this patent is extended or adjusted under 35 U.S.C. 154(b) by 0 days.

(21) Appl. No.: 11/538,250

(22) Filed: Oct. 3, 2006

(65) Prior Publication Data

US 2007/0081256 A1      Apr. 12, 2007

Related U.S. Application Data

(62) Division of application No. 10/781,598, filed on Feb. 18, 2004, now Pat. No. 7,133,207.

(51) Int. Cl.
*G02B 27/10* (2006.01)
*G02B 27/14* (2006.01)

(52) U.S. Cl. ............... 359/630; 359/629; 359/631; 359/633

(58) Field of Classification Search ............. 359/618, 359/629–631, 633; 345/7, 8
See application file for complete search history.

(56) References Cited

U.S. PATENT DOCUMENTS

| | | |
|---|---|---|
| 4,859,030 A | 8/1989 | Rotier |
| 4,874,214 A | 10/1989 | Cheysson et al. |
| 4,961,626 A | 10/1990 | Fournier, Jr. et al. |
| 5,050,996 A | 9/1991 | Allen |
| 5,198,930 A | 3/1993 | Muratomi |
| 5,249,081 A | 9/1993 | Rogers |
| 5,276,471 A | 1/1994 | Yamauchi et al. |
| 5,303,085 A | 4/1994 | Rallison |
| 5,383,053 A | 1/1995 | Hegg et al. |
| 5,408,346 A | 4/1995 | Trissel et al. |

(Continued)

OTHER PUBLICATIONS

Handschy, et al., "Image Generators with Compact Optics", Dec. 2000, pp. 1-2, USA http://www.nasatech.com/briefs/dec00/msc22992.html.

(Continued)

*Primary Examiner*—Ricky L Mack
*Assistant Examiner*—Jack Dinh
(74) *Attorney, Agent, or Firm*—Stephen B. Salai, Esq.; Thomas B. Ryan, Patent Agent; Harter Secrest & Emery LLP

(57) ABSTRACT

Virtual displays with micro-display engines are arranged in compact, lightweight configurations that generate clear virtual images for an observer. The displays are particularly suitable for portable devices, such as head-mounted displays adapted to non-immersive or immersive applications. The non-immersive applications feature reflective optics moved out of the direct line of sight of the observer and provide for differentially modifying the amount or form of ambient light admitted from the forward environment with respect to image light magnified within the display. Micro-display engines suitable for both non-immersive and immersive display applications and having LCD image sources displace polarization components of the LCD image sources along the optical paths of the engines for simplifying engine design. A compound imaging system for micro-display engines features the use of reflectors in sequence to expand upon the imaging possibilities of the new micro-display engines. Polarization management also provides for differentially regulating the transmission of ambient light with respect to image light and for participating in the image formation function of the image source.

16 Claims, 3 Drawing Sheets

U.S. PATENT DOCUMENTS

| | | |
|---|---|---|
| 5,459,612 A | 10/1995 | Ingleton |
| 5,596,451 A | 1/1997 | Handschy et al. |
| 5,648,789 A | 7/1997 | Beadles et al. |
| 5,808,800 A | 9/1998 | Handschy et al. |
| 5,808,801 A | 9/1998 | Nakayama et al. |
| 5,815,126 A | 9/1998 | Fan et al. |
| 5,864,326 A | 1/1999 | Rallison |
| 5,900,976 A | 5/1999 | Handschy et al. |
| 5,903,395 A | 5/1999 | Rallison et al. |
| 5,949,583 A | 9/1999 | Rallison et al. |
| 5,991,085 A | 11/1999 | Rallison et al. |
| 5,991,087 A | 11/1999 | Rallison |
| 6,025,890 A | 2/2000 | Chase |
| 6,097,543 A | 8/2000 | Rallison et al. |
| 6,160,666 A | 12/2000 | Rallison et al. |
| 6,271,969 B1 | 8/2001 | Mertz |
| 6,359,723 B1 | 3/2002 | Handschy et al. |
| 6,369,952 B1 | 4/2002 | Rallison et al. |
| 6,525,709 B1 | 2/2003 | O'Callaghan |
| 6,710,928 B2 | 3/2004 | Roest |

OTHER PUBLICATIONS

Ilixco, "I-glasses Head Mounting System", 2002, p. 1, USA, http://www.i-glassesstore.com/ig-headgear.html.

Hakkinen, Jukka, "Ergonomics of Head-Worn Virtual Displays", Sep. 22, 2003, pp. 1-4, USA http://www.nokia.com/nokia/o,43777,00.html.

MICRO-DISPLAY ENGINE

RELATED APPLICATIONS

This application is a divisional application of copending nonprovisional U.S. patent application Ser. No. 10/781,598 filed on Feb. 18, 2004, which copending application is hereby incorporated by reference.

BACKGROUND OF THE INVENTION

1. Field of the Invention

The invention relates to micro-display engines, particularly for portable displays, such as head-mounted viewers. Typically, the micro-display engines feature compact image generators that output real images and magnifying optics that produce enlarged virtual images.

2. Description of Related Art

Micro-display engines can be incorporated into a variety of devices and are particularly suitable for portable devices including hand-held, wrist-worn, or head-mounted devices. For example, the micro-display engines can be used in pagers, wireless mobile telephones, or wrist-worn computers or can be mounted in various types of viewers for displaying data, graphics, or video.

Among the known devices, single micro-display engines are used in monocular viewers or biocular viewers, which provide dual images of the same image sources, and pairs of micro-display engines are used in binocular viewers. All three types of viewers can be head-mounted (i.e., mounted on an observer's head), which are intended for viewing only by the wearers of the displays.

The micro-display engines include compact image sources and optical focusing systems for magnifying the images produced by the sources. The usual outputs of the image sources are small but high-resolution real images. The focusing systems magnify the high-resolution images as virtual images within a desired field of view. Both the image sources and the focusing systems are made as small and lightweight as possible to minimize the effect of their presence on the user.

Reflective focusing optics are preferred over refractive lens systems to avoid chromatic aberrations. The apparent field of view tends to increase as the focal length decreases. Magnification of a virtual image also tends to increase as the object distance approaches the focal length. Both requirements can be met with a single reflective focusing optic (e.g., a concave mirror), that can be positioned close to both the observer's eyes and the image source. Typically, the reflective focusing optic is aligned with the observer's eyes and is optically coupled to the image source through a beamsplitter. The beamsplitter reflects image light from the image source to the reflective focusing optic and transmits the image light from the reflective focusing optic to the observer's eyes.

The micro-display engines can be of the immersive or non-immersive type. Immersive displays block the transmission of ambient light in alignment with the view of the display. Non-immersive displays allow ambient light to transmit through the displays in alignment with the view of the display. For example, objects in the observer's environment can be seen through some non-immersive virtual displays, including such displays that present information about the observer's environment. Other non-immersive displays admit light so the observer can remain oriented to the environment that would otherwise be in view or for purposes of background lighting. Either type of display, immersive or non-immersive, can be enclosed in a full or partial housing (also referred to as a shroud) to block the admission of unwanted ambient light within the field of view.

Ambient light in the viewing direction is typically admitted into the imaging systems of non-immersive displays employing reflective focusing optics through the reflective focusing optics themselves. This requires the reflective focusing optics to be at least partially transmissive to admit ambient light and at least partially reflective to magnify the image source. The partial reflectivity results in the loss of some light from the image source. The partial transmissivity results in the loss of some on-axis ambient light. The loss of image light is inefficient, requiring a higher output image source. The loss of ambient light may also be of concern. Views transmitted by ambient light through the partially reflective focusing optics can also be undesirably distorted by passage through the partially reflective focusing optics.

Transmissive liquid crystal displays (LCDs) are among the preferred image sources. Transmissive LCD's typically interleave a polarization varying layer containing liquid crystals between two polarizer layers. Light is admitted through the first polarizer layer and images produced by the LCDs appear on the second polarizer layer. It is the real image appearing on the second polarizer layer that is magnified, generally as a virtual image, by the focusing optics. As such, the imaged surface of the second polarizer layer must be made optically correct to avoid the imaging of artifacts on the second polarizer layer or the introduction of distortions, aberrations, or other disturbances into the image, which adds considerably to the optical requirements and cost of the second polarizer layer.

BRIEF SUMMARY OF THE INVENTION

The invention among its various embodiments provides for improving the efficiency and performance of micro-display engines by making better use of image light and by separately regulating the admission of ambient light. Polarization management is used for conserving image light, for regulating the admission of ambient light, and for directing image light among multiple surfaces for enhancing viewing performance. Polarizing components associated with image sources can be incorporated into other optical components of the display to reduce the number of components, simplify the requirements of imaged surfaces, and avoid imaging errors associated with imaging polarizing components. Improved efficiencies, performance enhancements, and cost and weight reductions are made possible by the application of the various embodiments of the invention.

One example of a non-immersive virtual display for combining image light and ambient light in accordance with the invention includes an image source and a reflective focusing optic both supported by a housing and aligned along a common optical axis. A viewing aperture and an ambient-light-admitting aperture are formed in the housing and aligned along a viewing axis that is inclined to the common optical axis. A beamsplitter supported by the housing at an intersection of the common optical axis and the viewing axis is positioned for: (a) transmitting image light between the image source and the reflective focusing optic along the common optical axis, (b) reflecting the transmitted image light between the reflective focusing optic and the viewing aperture along the viewing axis, and (c) transmitting ambient light between the ambient-light-admitting aperture and the viewing aperture along the viewing axis superimposed upon the transmitted image light that is reflected along the viewing axis.

Although both the image light and the admitted ambient light are superimposed along the viewing axis, the ambient light reaches the beamsplitter independently of the reflective focusing optic. Accordingly, the reflective focusing optic can be made fully reflective to conserve the image light. The ambient light can be separately transmitted to the beamsplitter without substantial loss.

Preferably, the common optical axis extends in a transverse plane that intersects an observer's eyes and that includes the viewing axis. The preferred beamsplitter includes an interface at which incident light is transmitted and reflected, and the beamsplitter interface extends substantially normal to the transverse plane. The image source includes an output plane that also preferably extends substantially normal to the transverse plane.

The non-immersive display can also include an ambient-light-admitting adjuster that regulates the amount of ambient light transmitted between the ambient-light-admitting aperture and the viewing aperture along the viewing axis. Preferably, both the beamsplitter and the ambient-light-admitting aperture are polarization sensitive, and the ambient-light-admitting adjuster varies polarization sensitivities between the beamsplitter and the ambient-light-admitting aperture. For example, both the beamsplitter and the ambient-light-admitting aperture can be associated with polarizers, and the ambient-light-admitting adjuster varies a relative angular orientation of the aperture polarizer with respect to the beamsplitter polarizer. A phase adjuster can be used for rotating polarization of the image light transmitted through the polarization-sensitive beamsplitter en route to and from the reflective focusing optic to improve the efficiency of the required transmissions and reflections performed by the beamsplitter.

In addition, the non-immersive display can include an optically active component located between the ambient-light-admitting aperture and the beamsplitter for altering the ambient light that is combined with the transmitted image light along the viewing axis. Examples of such a component include an optical filter, a lens, and a polarizer.

Another non-immersive virtual display in accordance with the invention includes a housing having an ambient-light-admitting aperture and a viewing aperture, an image source, and a reflector. The housing encloses optical transmissions along different optical pathways including transmissions of image light from the image source to the reflector along a first optical pathway and transmissions of ambient light from the ambient-light-admitting aperture to the viewing aperture along a second optical pathway. A beamsplitter located at an intersection of the first and second optical pathways supports the transmissions of image light and ambient light along the first and second pathways, and also supports reflection of the transmitted image light from the reflector to the viewing aperture for combining the transmitted image light with the transmitted ambient light along the second optical pathway.

The non-immersive display also preferably includes an ambient-light admitting adjuster that regulates the amount of ambient light transmitted from the ambient-light-admitting aperture to the viewing aperture along the second optical pathway. For this purpose, the beamsplitter can be made polarization sensitive, and a polarization-sensitive component can be added along the second optical pathway between the beamsplitter and the ambient-light admitting aperture. The ambient-light-admitting adjuster can be arranged to vary the polarization sensitivities of the polarization-sensitive component with respect to the beamsplitter. For example, the polarization-sensitive component can be arranged as a polarizer, and the ambient-light-admitting adjuster can be arranged for rotating the polarizer.

In addition, an optically active component can be located between the ambient-light-admitting aperture and the beamsplitter for altering the ambient light that is combined with the transmitted image light along the viewing axis. Such a component can be used for such purposes as filtering, focusing, dispersing, polarizing, or diffracting the ambient light.

A micro-display engine than can be used in both immersive and non-immersive displays includes an image source and a reflective focusing optic aligned along a common optical axis. A viewing aperture is aligned with a viewing axis that is inclined to the common optical axis. A polarization-sensitive beamsplitter is located at an intersection of the viewing axis and the common optical axis. A phase adjuster is located along the common optical axis between the polarization-sensitive beamsplitter and the reflective focusing optic. The polarization-sensitive beamsplitter transmits image light generated by the image source along the common optical axis toward the reflective focusing optic. The phase adjuster rotates polarization of the image light transmitted through the polarization-sensitive beamsplitter en route to and from the reflective focusing optic. The polarization-sensitive beamsplitter reflects the polarization-rotated image light along the viewing axis toward the viewing aperture.

In a preferred configuration, the common optical axis extends in a substantially horizontal direction within a transverse plane that intersects the observer's eyes and that includes the viewing axis. The beamsplitter within the configuration includes an interface at which incident light is transmitted and reflected, and the beamsplitter interface preferably extends substantially normal to the transverse plane. The image source within the configuration includes an output plane that preferably extends substantially normal to the transverse plane.

The image source is preferably of a type that includes both a controllable polarization rotator that is responsive to the application of a control signal for varying local polarization characteristics in the output plane and a polarizer that cooperates with the polarization rotator for producing a polarized image. The reflective focusing optic preferably forms a magnified virtual image of the output plane visible along the viewing axis. The polarizer is spaced from the output plane to produce the polarized image. For example, the polarizer of the image source can be incorporated into the polarization-sensitive beamsplitter.

Another micro-display engine in accordance with the invention includes an image source having a controllable polarization rotator that is responsive to the application of a control signal for varying local polarization characteristics of outputted image light in an output plane encoding an image and a polarizer that cooperates with the polarization rotator for converting the polarization-encoded image into a visible polarized image. An at least partially reflective focusing optic forms a magnified virtual image of the object plane. The polarizer is spaced from the object plane for filtering the image light emitted from the object plane to produce the visible polarized image substantially clear of imageable artifacts of the polarizer.

A beamsplitter preferably directs the image light emitted from the object plane in a first direction toward the at least partially reflective focusing optic and preferably directs the reflected image light in a second direction for viewing. The polarizer can be incorporated into the beamsplitter.

In addition, the display engine can include a phase adjuster located between the beamsplitter and the reflective focusing optic. The phase adjuster rotates polarization of the image light en route to and from the reflective focusing optic in the first direction so that the polarization rotated image light propagates from the beamsplitter in the second direction.

The display engine can also include a housing having both a viewing aperture and an ambient-light-admitting aperture aligned in the second direction. An ambient-light-admitting adjuster can be used to regulate the amount of ambient light transmitted between the ambient-light-admitting aperture and the viewing aperture along the second direction.

The polarizer of the image source is preferably a first of two polarizers. A first of the polarizers is preferably incorporated into the beamsplitter for forming a polarized image and a second of the polarizers is preferably located at the ambient-light-admitting adjuster for varying the amount of ambient light reaching the viewing aperture. The preferred ambient-light-admitting adjuster varies a relative angular orientation of the first and second polarizers.

virtual display with an imaging system in accordance with the invention features an image source including a polarization-rotator that is responsive to the application of a control signal for varying local polarization characteristics of an optical output and a polarizer that cooperates with the polarization-rotator for producing a polarized image. A magnifier forms an enlarged image of the optical output of the polarization-rotator. The polarizer is located remote from a conjugate focus of the magnifier for further modifying the optical output and producing the polarized image.

The polarization rotator preferably has an output plane that is located at a conjugate focus of the magnifier. The output plane of the polarization rotator is preferably an object plane of the magnifier, and the polarized image is preferably a virtual image of the object plane.

A beamsplitter can be used to both direct the optical output of the polarization rotator to the magnifier and direct a magnified image of the optical output of the polarization rotator to the observer. The magnifier is preferably a reflective focusing optic. In addition, the beamsplitter can be arranged to function as the polarizer.

A phase adjuster can be located between the beamsplitter and the magnifier. The phase adjuster is preferably arranged for rotating polarization of the optical output of the polarization rotator en route to and from the magnifier in a first direction so that the polarization rotated optical output propagates from the beamsplitter toward the observer in a second direction.

The invention also features improvements to imaging systems of the type including a controllable polarization rotator comprising a plurality of controllable pixels that differentially rotate local polarization of image light appearing as different polarizations in an output plane. A focusing optic focuses on the output plane. A polarizer located beyond the depth of field of the focusing optic filters the different polarizations of the image light for producing an image.

Preferably, the focusing optic is arranged for producing a virtual image of the output plane. In addition, the focusing optic is preferably a magnifier formed as a reflective focusing optic. The polarizer is preferably formed as a part of an at least partially reflective optic that directs the image light from the output plane to the focusing optic. For example, the partially reflective optic can be a polarizing beamsplitter that also directs an image of the output plane to an observer.

Another imaging system is defined with respect to a polarization rotator comprising a plurality of controllable pixels that differentially rotate local polarization of image light encoding an image in an output plane as different polarizations lacking contrast between the different polarizations. A polarizer spaced apart from the output plane along a viewing pathway of the output plane filters the different polarizations of the image light for providing a view of the output plane that includes contrast between the different polarizations. The polarizer is spaced apart from the output plane by an amount that precludes the appearance of the encoded image as a real image on the polarizer.

The pixels of the polarization rotator are preferably separately controllable for rotating plane-polarized light by different amounts to encode the image in the output plane. The linearly polarized light from one of the pixels is overlapped by the linearly polarized light from a plurality of adjacent pixels on the polarizer. For example, the overlapping linearly polarized light on the polarizer can appear as elliptical or randomly polarized light.

An alternative micro-display engine having additional capabilities for forming a virtual image includes in common with other of the described engines an image source for producing a real image and a beamsplitter optically connected to the image source. However, the alternative engine also includes a pair of reflective optics optically connected in sequence by the beamsplitter for producing an enlargement of the real image as a virtual image that is visible through the beamsplitter.

A first optical pathway preferably connects the image source to a first of the pair of reflective optics by one of transmission through and reflection from the beamsplitter. A second optical pathway preferably connects the first reflective optic to a second of the pair of reflective optics by the other of transmission through and reflection from the beamsplitter. A third optical pathway preferably provides for connecting the second reflective optic with a viewing aperture by the one of transmission through and reflection from the beamsplitter.

Preferably, the beamsplitter is polarization sensitive and transmits or reflects the light emitted by the image source in accordance with a polarization state of the light. For example, the beamsplitter can be a polarizing beamsplitter. A phase adjuster system can be used for sequentially varying the polarization state of the light between encounters with the beamsplitter along the first, second, and third optical pathways. For example, a first phase adjuster can be located along a common portion of the first and second optical pathways between the beamsplitter and the first reflective optic, and a second phase adjuster can located along a common portion of the second and third optical pathways between the beamsplitter and the second reflective optic. In addition, the light produced by the image source and propagating along the first optical pathway is preferably polarized before encountering the beamsplitter to avoid directing the light toward the viewing aperture before encountering the pair of reflective optics.

The reflective optics can take a variety of forms for contributing to the production of the virtual image. For example, one of the reflective optics can have a nominally planer reflective surface and the other of the reflective optics can have a non-planar reflective surface. Alternatively, both of the reflective optics can have non-planer reflective surfaces for contributing to the magnification of the virtual image. At least one of the reflective optics can have an aspheric reflective surface for contributing to a focusing function for enhancing a view of the virtual image.

Examples of monocular and binocular head-mounted viewers particularly suitable for use with this invention are disclosed in co-assigned U.S. application Ser. No. 29/196,887 for Portable Virtual Display, Ser. No. 29/196,880 for Virtual Display Eyeglasses, Ser. No. 10/752,948 for Virtual Display Headset, and Binocular Virtual Display Imaging Device all filed on 7 Jan. 2004 and all hereby incorporated by reference.

BRIEF DESCRIPTION OF THE SEVERAL VIEWS OF THE DRAWING(S)

DETAILED DESCRIPTION OF THE INVENTION

Figure 1:
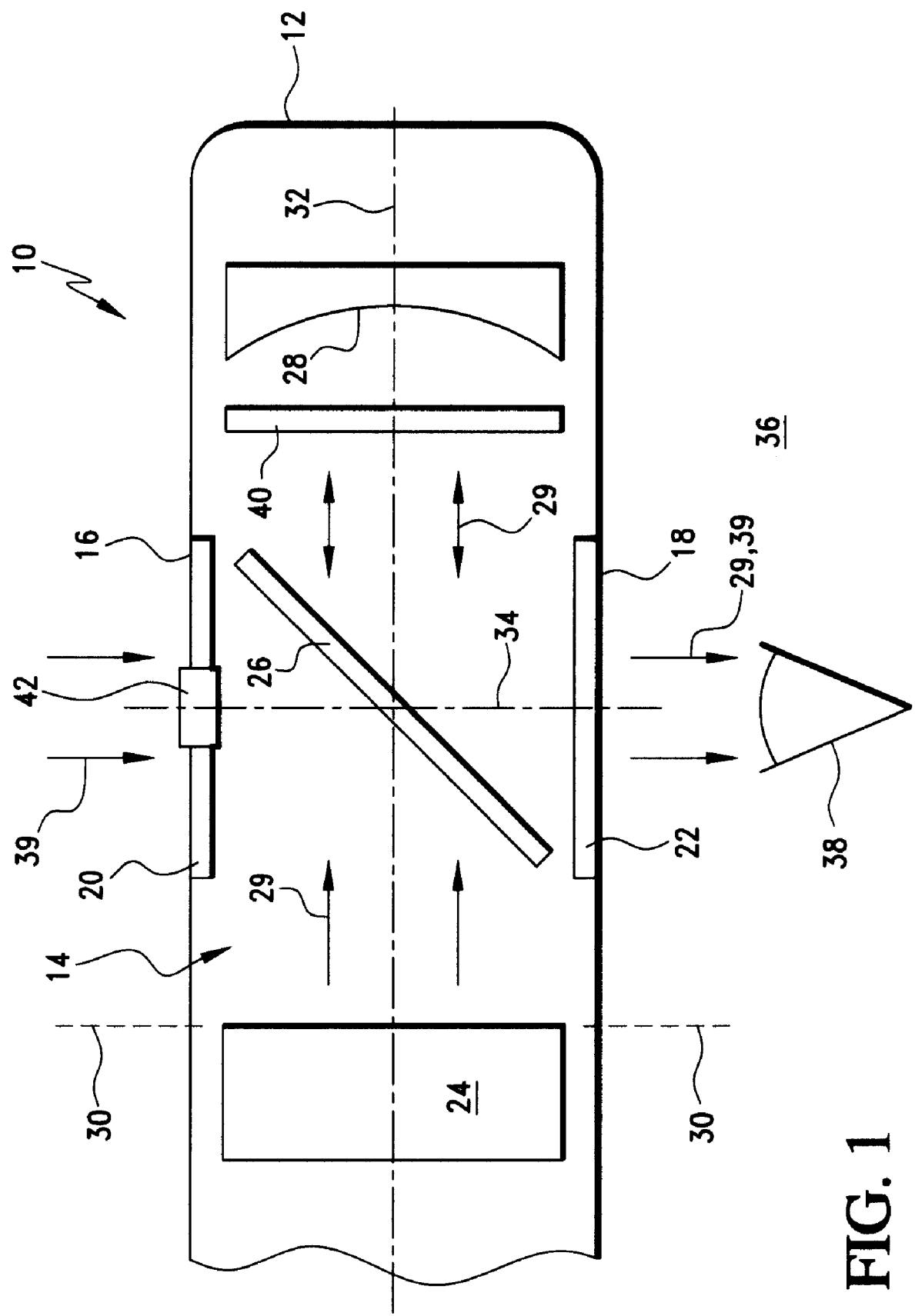
FIG. 1 is a schematic sectional view showing a cut-away portion of a non-immersive display containing a micro-display engine appearing as a plan view in a horizontal plane.

A non-immersive display 10 of the type especially suitable for use in portable display devices such as head-mounted viewers is depicted in FIG. 1. A housing 12 of the display (only part of which is shown in FIG. 1) supports and provides any required shrouding for a micro-display engine 14. For example, the housing 12 can be molded into a form that provides for locating, mounting, and enclosing components of the micro-display engine 14 and also provides for limiting or excluding the ingress of unwanted environmental light into the optical pathways of the micro-display engine 14 or into the viewing path of an observer. Typical of head-mounted displays, the housing can be fashioned in the form of one or more eyecups.

In the non-immersive embodiment depicted in FIG. 1, limited amounts of ambient environmental light are admitted into the housing 12 through an ambient-light-admitting aperture 16. Images produced within the housing 12 can be viewed through a viewing aperture 18 also formed within the housing 12. An entrance window 20 fills the ambient-light-admitting aperture 16 and an exit window 22 fills the viewing aperture 18 to protect the micro-display engine 14 from other non-optical environmental influences. The entrance and exit windows 20 and 22 can be simple plate-shaped transmissive optics or can be made more complex to perform additional optical functions such as filtering or focusing.

The micro-display engine 14 includes an image source 24, which is preferably a compact high-resolution image generator capable of producing real images containing more information than can normally be discerned by the human eye without magnification. Preferably, the image source 24 is a back-lit liquid crystal display (LCD), but a variety of other image sources can be used including front-lit LCDs, referred to as liquid crystal on silicon (LCOC) displays, organic light emitting diodes (OLEDs), field emission displays (FEDs), and cathode ray tubes (CRTs).

Also included within the micro-display engine 14 are a beamsplitter 26 and a reflective focusing optic 28. The beamsplitter 26 functions as a beam director for directing image light 29 emitted from the image source 24 throughout the micro-display engine 14. Preferably, the beamsplitter is of a type capable of transmitting and reflecting incident light to predetermined destinations, such as between the image source 24 and the focusing optic 28 and between the focusing optic 28 and the viewing aperture 18. Although shown in its preferred form as a planar optic, the beamsplitter can also have a form that is curved in one or more orthogonal directions.

The reflective focusing optic 28 is preferably a fully reflective concave mirror that is focused on an output plane 30 of the image generator 24 for enlarging real images appearing in the output plane as virtual images visible to an observer through the viewing aperture 18. The reflective focusing optic 28, which functions as a magnifier, can have a nominally spherical form for providing the required enlargement. A focal length of around 25 millimeters is considered typical for head-mounted applications with outer dimensions of the reflective focusing optic measuring approximately 13 by 20 millimeters (with the longer dimension oriented in the horizontal viewing direction. Other typical aspect ratios are "3:4" (vertical to horizontal) and "16:9" (horizontal to vertical) aspect ratios. Of course, the reflective focusing optic could also be much larger. Magnifications of 10 to 20 times are preferred. Aspherical forms can be used to accommodate aberrations, where required, in accordance with conventional imaging practices. Of course, the actual dimensions and surface forms of the image source and focusing optics are varied in accordance with the particular purposes and requirements of the micro-display engine 14.

The image source 24 and the reflective focusing optic 28 of the illustrated configuration are aligned along a common optical axis 32 and the ambient-light-admitting aperture 16 and the viewing aperture 18 are aligned along a viewing axis 34 that is inclined to the common optical axis 32. The beamsplitter 26 is preferably located at an intersection of the two axes 32 and 34 and inclined to both. Preferably, the common optical axis 32 and the viewing axis 34 are oriented orthogonally, and the beamsplitter 26 (i.e., the active interface of the beamsplitter) is inclined by 45 degrees to both axes 32 and 34.

Particularly for use in a head-mounted display, the common optical axis 32 can be understood to extend in horizontal direction within a transverse plane 36 (i.e., the plane of FIG. 1) that intersects the observer's eyes 38 (only one shown) and includes the viewing axis 34. Both the output plane 30 and the beamsplitter 26, as referenced by its active interface, preferably extend normal (i.e., orthogonal) to the transverse plane 36. The arrangement allows the image generator 24 and the reflective focusing optic 28 to be located side to side in a horizontal plane straddling the observer's eye 38 while preserving a forward view along the viewing axis 34. Ambient light 39 can pass directly through the housing 12 between the entrance window 20 and the exit window 28 without encountering any substantial optical obstruction beyond the beamsplitter 26. Accordingly, a clear forward view of the observer's environment is possible.

For performing its beam directing functions, the beamsplitter 26 is preferably a polarizing beamsplitter (e.g., a wire grid polarizer) for alternately transmitting and reflecting incident light in accordance with its alternating polarization. A phase adjuster 40, such as a quarter wave plate, is located along the common optical axis 32 between the beamsplitter 26 and the reflective focusing optic 28 for providing the alternating polarization.

The image light 29 of a predetermined polarization (e.g., "S" or "P" as referenced by the beamsplitter 26) transmits through the beamsplitter 26 from the image source 24 to the reflective focusing optic 28. Preferably, the image light 29 emitted from the image source 24 is randomly polarized or polarized in the direction that transmits through the beamsplitter 26. Any reflected light is directed away from the exit window 22. While propagating to and from the reflective focusing optic 28, the image light 29 encounters the phase adjuster twice, which rotates the polarization (e.g., converts "S" polarization to "P" polarization) to an orientation that is reflected by the beamsplitter 26. As a result, the image light 29 returned from the reflective focusing optic 28 is reflected by the beamsplitter 26 along the viewing axis 34 in the direction of the viewing window 22. The beamsplitter 26 also transmits ambient light 39 of the opposite polarization along the viewing axis 34 toward the viewing window 22. Thus, a virtual image of the output of the image generator 24 is superimposed upon a forward view of the environment. The polarization directions of the image light 29 and the ambient light 39 reaching the eye 38 of the observer can be oriented for optimizing viewing conditions, such as reducing glare.

Both the amount and form of the ambient light that is allowed to pass through the entrance and exit windows 20 and 22 can be further controlled in accordance with desired viewing objectives. For example, an ambient-light-admitting adjuster 42 can be used to regulate the amount of ambient light 39 that is admitted through the ambient-light-admitting aperture 16. Preferably, the ambient-light-admitting adjuster 42 is located between the ambient-light-admitting aperture 16 and the beamsplitter 26 to affect the ambient light 39 without also affecting the image light 29.

In its preferred form, the ambient-light admitting adjuster 42 is a rotatable polarizer, which can be formed as a part of the entrance window 20 or as a separate element. When the polarization direction of the ambient-light admitting adjuster 42 is aligned with the polarization direction of the beamsplitter 26, then the ambient-light admitting adjuster 42 has a minimal effect on the amount of ambient light 39 that reaches the eye 38 of the observer. However, if the polarizing ambient-light admitting adjuster 42 is rotated orthogonal to the polarization direction of the beamsplitter 26, no ambient light 39 reaches the eye 38 of the observer. Rotational positions between the aligned and orthogonal positions allow progressive adjustments to be made to the amount of ambient light 39 that is transmitted through the display 10.

Additional optically active components can be located along the viewing axis 34, particularly in advance of the beamsplitter 26 to differentially modify the ambient light 39 (with respect to the image light 29) reaching the viewing window 22. The components can be incorporated into the entrance window 20 or can be located elsewhere along the viewing axis 34. Such components include in addition to polarizers, filters, lenses, and irises, any of which can be made adjustable for further regulating the ambient light 39 or its imaging.

Figure 2:
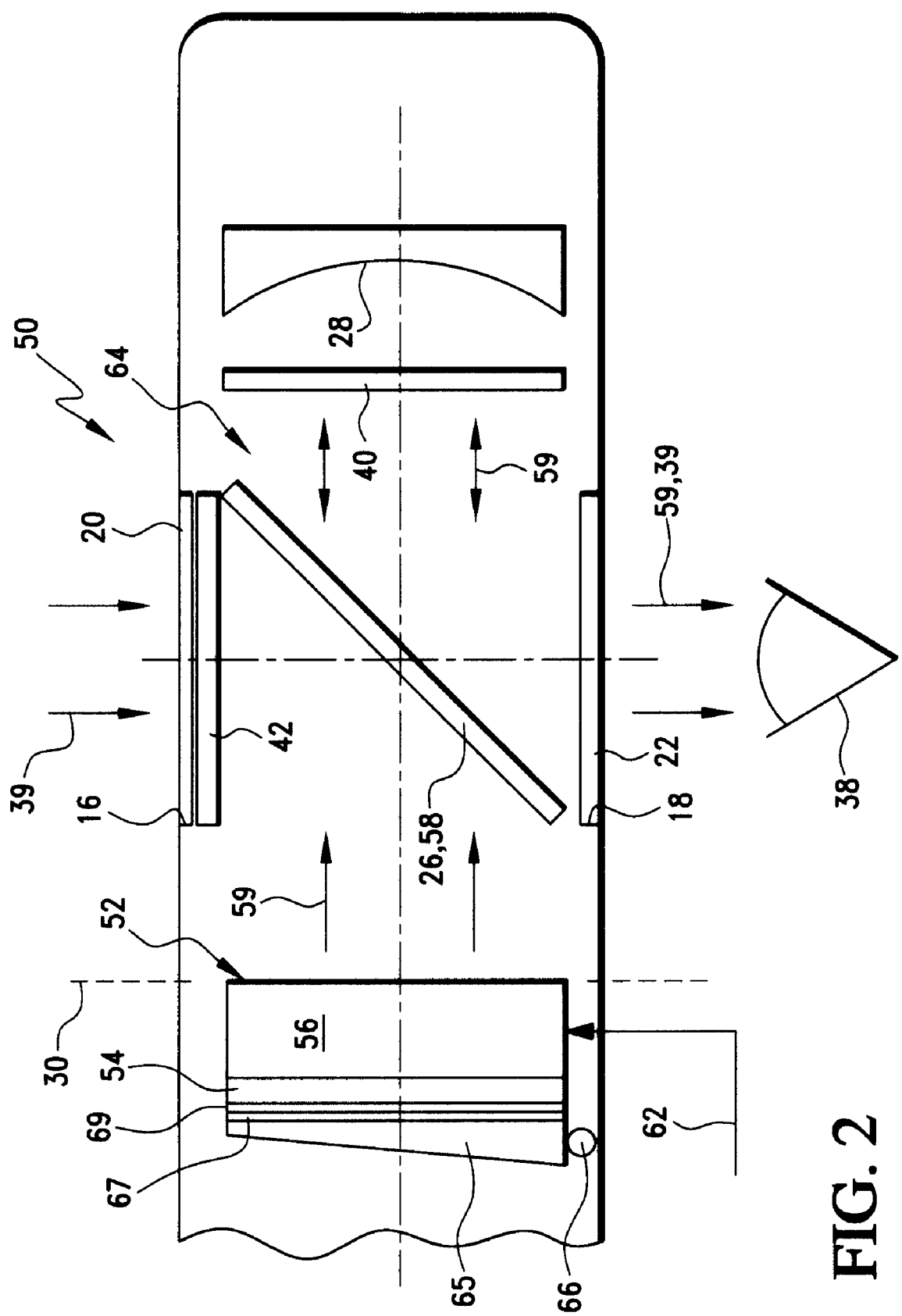
FIG. 2 is a similar schematic view of a non-immersive display having a modified micro-display engine in which a component of an image source is incorporated within beamsplitter of the engine.

An alternative non-immersive display 50 is depicted in FIG. 2 with a modified image source 52. Components in common with the non-immersive display 10 retain their reference numerals.

The modified image source 52 is composed of three layers 54, 56, and 58. The layers 54 and 58 are polarizers, and the layer 56 is a controllable polarization rotator that is responsive to a control signal 62 for varying local polarization characteristics of the optical output. The polarization rotator 56 comprises a plurality of controllable pixels that differentially rotate local polarization of image light 59 appearing as different polarizations in the output plane 30. The polarizer 54 and the polarization rotator 56 are located together, and the polarizer 58 is incorporated elsewhere within the modified micro-display engine 64. A light source 66 located behind the polarizer 54 provides backlighting for the image source 52.

The image source 52 is preferably a modified liquid crystal display (LCD) of the active matrix type. The polarization rotator 56 contains the addressable liquid crystal pixels, whose angular orientation is controlled by a local electric charge derived from the control signal 62. The polarizer 54 linearly polarizes light from the light source 66. The polarization rotator 56 selectively rotates the polarization of individually addressed pixels with respect to an initial polarization direction so that an image is encoded in the output plane 30 by differentially rotated polarizations. A visible image does not appear until the polarizer 58 filters the different polarizations of the image light 59 to provide image contrast as a function of polarization direction.

Ordinarily, the polarizer 58 is located next to the polarization rotator 56 so that a visible image appears on the polarizer 58, and the output plane 30 (object plane) of a focusing optic such as the reflective focusing optic 28 is located coincident with the polarizer 58 so that image visible on the polarizer 58 is enlarged as the desired virtual image. However, in accordance with this aspect of the invention, no such image appears on the polarizer 58 because the polarizer 58 is located remote from the output plane 30, and the polarizer 58 itself is not imaged because the polarizer 58 is spaced apart from a conjugate focus of the reflective focusing optic 28. Preferably, the polarizer 58 is incorporated into to beamsplitter 26 by fashioning the beamsplitter 26 as a polarizing beamsplitter.

By incorporating the function of one of the layers (the polarizer 58) of the image source 52 into an existing component (the beamsplitter 26) of the modified micro-display engine 64, a cost savings can be realized on two accounts. First, one less optically active component is required for the entire micro-display engine 64. Second, the polarizer 58 is no longer required to be an imaged surface and can be formed with wider tolerances in this respect. The imaged surface in the output plane 30 can be a simple plane parallel window enclosing the liquid crystals.

Although preferably incorporated into the beamsplitter 26, the polarizer 58 can be located elsewhere along the optical path of the image light 59 to the eye 38 of the observer. For example, the polarizer 58 could be located at the exit window 22. However, if other polarizers or phase adjusters are used elsewhere along this optical path, care must be taken to avoid blocking polarization components intended for imaging and to avoid passing polarization components intended to provide image contrast. The polarizer 58 should be spaced apart from the output plane 30 at which the reflective focusing optic 28 is focused at least through a distance outside the depth of field of the reflective focusing optic 28. The polarizer 58 is also spaced far enough from the output plane 30 so that a visible image of the intended output of the image source 52 is not formed on the polarizer 58.

Micro-display engines having such polarization-dependent image sources with polarizers that contribute to the formation of an image incorporated elsewhere in the engines can take a variety of forms for use in both non-immersive and immersive displays. Simple or compound focusing optics can be used in reflective or transmissive modes. The optical imaging paths can include other directional optics including reflective surfaces in addition to or as a substitute for a beamsplitter.

Figure 3:
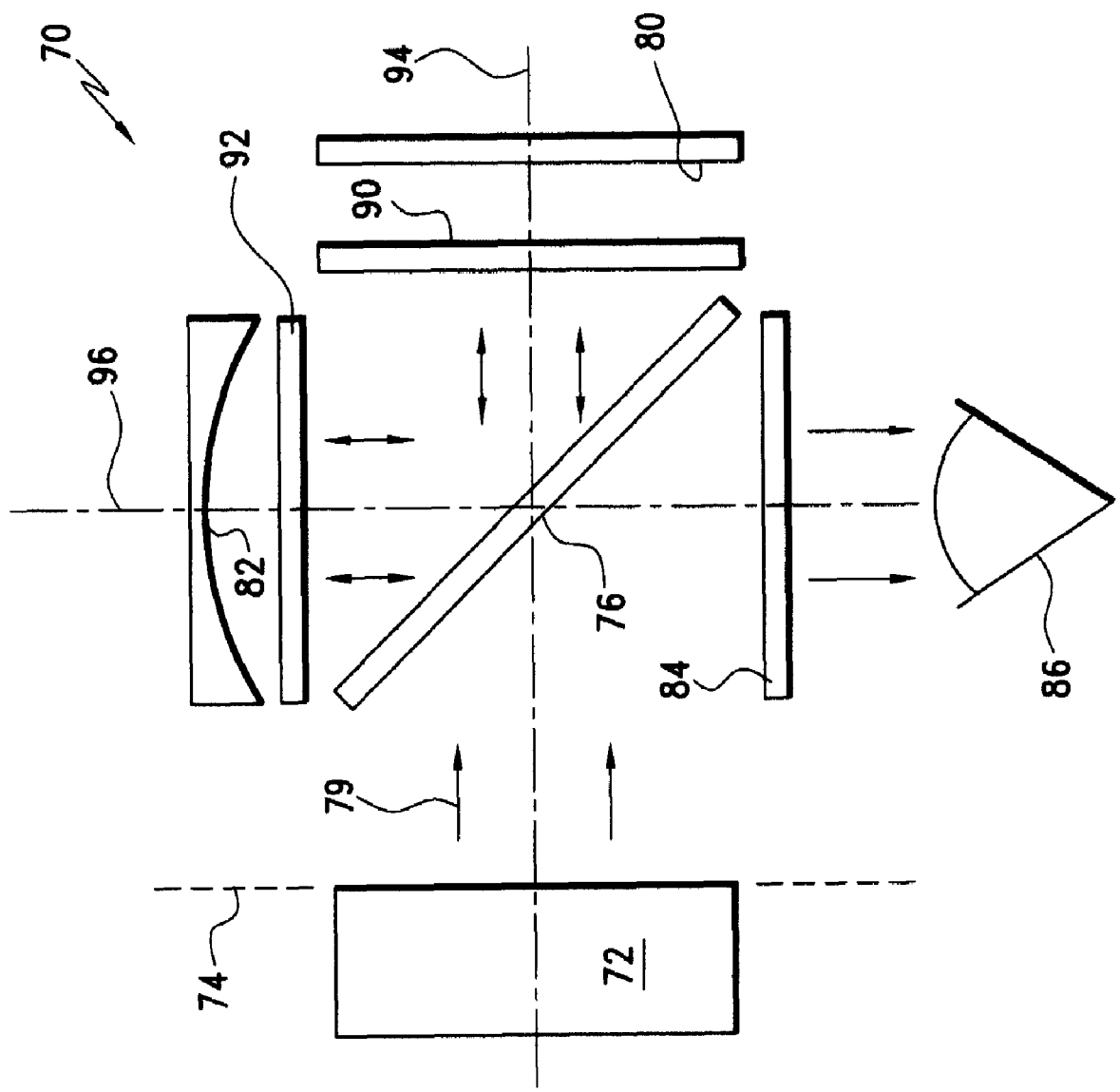
FIG. 3 is a schematic plan view of an alternative micro-display engine having a compound focusing system.

A micro-display engine 70 with a compound imaging system is depicted in FIG. 3. An image source 72, which can be any of the types mentioned previously, generates a real image in an output plane 74. A beamsplitter 76 receives image light 79 from the image source 72 along a first optical pathway, directs the image light in sequence between a pair of reflective optics 80 and 82 along a second optical pathway, and directs the light toward an exit window 84 (within a viewing aperture not shown) for viewing by the eye 86 of an observer along a third optical pathway.

For controlling the propagation of the image light 79 along the desired optical pathways without substantial losses, the beamsplitter 76 is preferably a polarizing beamsplitter and phase adjusters 90 and 92 are located along the second optical pathway between the beamsplitter 76 and each of the reflective optics 80 and 82. The function of the phase adjusters 90 and 92 is to orthogonally rotate the polarization of the image light 79 between encounters with the polarizing beamsplitter 76 so that the beamsplitter 76 alternately transmits and reflects the image light 79. Different portions of the same phase adjuster could also be used for this purpose.

For example, the image light 79 approaching the beamsplitter 76 is preferably plane polarized in a direction matching the polarization orientation of the beamsplitter 76 for transmitting light. This prevents unused light from reflecting through the exit window 84 and reducing contrast of the intended magnified virtual image of the real image appearing in the output plane 74. Alternatively, a polarizer oriented in common with the beamsplitter 76 could be used to block the unused light.

The image light 79 first transmitted through the beamsplitter 76 is reflected and preferably reshaped by the reflective optic 80 and is polarization rotated by the phase adjuster 90 so that upon re-encountering the beamsplitter 76, the image light 79 is reflected on route to the second reflective optic 82. The image light 79 is reflected and preferably further reshaped by the second reflective optic 82 and is polarization rotated by the phase adjuster 92 so that upon further re-encountering the beamsplitter 76, the image light 79 is transmitted on route through the exit window 84 to the eye 86 of the observer.

In the embodiment shown in FIG. 3, the image generator 72 and the reflective optic 80 are located along a common optical axis 94, and the reflective optic 82 and the exit window 84 are located along a viewing axis 96 that is inclined to the common optical axis 94 (preferably by 90 degrees). Also in the same illustrated embodiment, the polarization management of the beamsplitter 76 provides for sequentially transmitting, reflecting, and transmitting the image light 79 to appropriately direct the light through the engine 70. However, the same or corresponding components can be oriented differently along with the beamsplitter to produce a comparable sequence of optical encounters by sequentially reflecting, transmitting, and reflecting the image light at the beamsplitter. One such alternative arrangement locates the two reflective optics along one axis and the image source and the exit window along another.

Although the reflective optic 80 is depicted with a nominally planar form and the reflective optic 82 is depicted with a nominally spherical form, the reverse is also possible, along with both reflective optics having a curved form. Aspheric forms can be used to provide further control over optical light paths through the engine 70. The addition of a reflective surface to the engine 70 provides further optical control over the presentation of the virtual image to the eye 86 of an observer. For example, the optical combination of the two lenses can contribute to the arrangement of the engine 70 as a telephoto or retrofocus system and also provides for further magnifying the virtual image and for enlarging the "eye box" (i.e., linear orthogonal dimensions within which the eye 86 can be relatively moved in a tangent plane with respect to the engine 70 while the enlarged image remains fully visible). "Eye boxes" measuring at least 8 millimeters by 13 millimeters are preferred for most head-mounted applications.

The invention in one or more of its various embodiments contributes to miniaturization of display technologies, particularly portable display technologies. Reflective optics are favored over lenses to reduce weight and to provide virtual magnifications of color images without the attendant chromatic aberrations caused by lenses. Improvements contemplated for non-immersive displays include moving reflective optics out of the direct line of sight of the observer and differentially modifying the amount or form of ambient light admitted from the forward environment with respect to image light magnified within the display.

Improvements to micro-display engines suitable for both non-immersive and immersive display applications include displacing an optical component that participates in initial image formation by the image sources elsewhere along the optical path of the engines. The displacement of the component from an object plane of the focusing system reduces requirements for the component. By incorporating the function of the displaced component within an existing component of the engine, the engine is simplified.

A compound imaging system featuring the use of reflectors in sequence expands upon the imaging possibilities of the new micro-display engines within a confined space. Polarization management provides for efficient transmission of polarized image light between the image source and an exit window within such a confined space by intersecting and overlapping optical pathways between optical components without substantial losses of the image light. Polarization management also provides for differentially regulating the transmission of ambient light with respect to image light and for participating in the image formation function of the image source.

The various improvements can be realized separately or in combination with each other.

The invention claimed is:

1. A micro-display engine comprising:
   an image source for producing a real image;
   a beamsplitter optically connected to the image source;
   a pair of reflective optics optically connected in sequence by the beamsplitter for producing an enlargement of the real image as a virtual image that is visible through the beamsplitter,
   a first optical pathway connects the image source to a first of the pair of reflective optics by one of transmission through and reflection from the beamsplitter,
   a second optical pathway connects the first reflective optic to a second of the pair of reflective optics by the other of transmission through and reflection from the beamsplitter,
   a third optical pathway provides for connecting the second reflective optic with a viewing aperture by the one of transmission through and reflection from the beamsplitter.

2. The engine of claim 1 in which the beamsplitter is a polarizing beamsplitter.

3. The engine of claim 2 in which a first phase adjuster is located along a common portion of the first and second optical pathways between the beamsplitter and the first reflective optic.

4. The engine of claim 3 in which a second phase adjuster is located along a common portion of the second and third optical pathways between the beamsplitter and the second reflective optic.

5. The engine of claim 2 in the image source forms the real image with image light, and the image light propagating along the first optical pathway is polarized before encountering the beamsplitter to avoid directing the image light toward the viewing aperture before encountering the pair of reflective optics.

6. The engine of claim 1 in which one of the reflective optics has a nominally planer reflective surface and the other of the reflective optics has a non-planar reflective surface.

7. The engine of claim 1 in which both of the reflective optics have non-planer reflective surfaces for contributing to the magnification of the virtual image.

8. The engine of claim 7 in which at least one of the reflective optics has an aspheric reflective surface for contributing to a focusing function for enhancing a view of the virtual image.

9. A compound imaging system of a micro-display engine comprising:
   a beamsplitter for transmitting and reflecting light in different directions;
   first and second reflective optics for imaging light emitted from an image source through a viewing aperture;
   a first of optical pathway from the image source to the first reflective optic by one of transmission through and reflection from the beamsplitter;
   a second optical pathway connecting the first reflective optic to the second reflective optic by the other of transmission through and reflection from the beamsplitter; and
   a third optical pathway for connecting the second reflective optic to the viewing aperture by the one of transmission through and reflection from the beamsplitter.

10. The imaging system of claim 9 in which the beamsplitter is polarization sensitive.

11. The imaging system of claim 10 in which the beamsplitter transmits and reflects the light emitted by the image source in accordance with a polarization state of the light.

12. The imaging system of claim 11 in which the polarizer is a polarizing beamsplitter.

13. The imaging system of claim 12 further comprising a phase adjustment system for sequentially varying the polarization state of the light between encounters with the beamsplitter along the first, second, and third optical pathways.

14. The imaging system of claim 9 in which one of the reflective optics has a nominally planer reflective surface and the other of the reflective optics has a nonplanar reflective surface.

15. The imaging system of claim 9 in which both of the reflective optics have nonplaner reflective surfaces for contributing to the magnification of the virtual image.

16. The imaging system of claim 15 in which at least one of the reflective optics has an aspheric reflective surface for contributing to a focusing function for enhancing a view of the virtual image.

* * * * *